Nov. 28, 1967    C. G. GORDON ET AL    3,354,912
SECTIONAL HYDRAULIC VALVE STRUCTURE
Filed Jan. 11, 1965
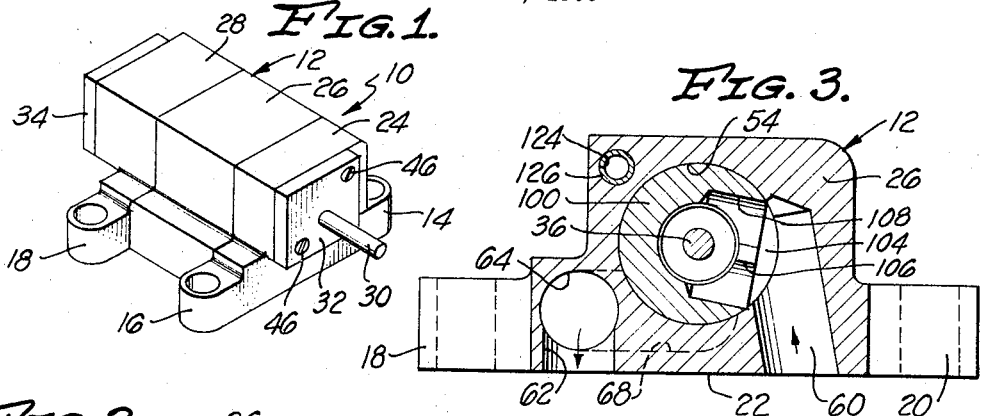
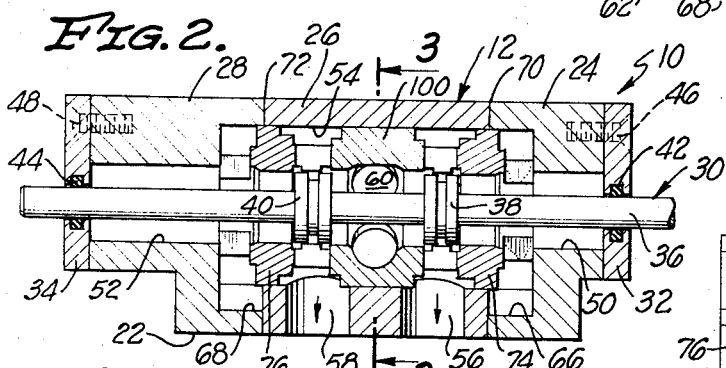
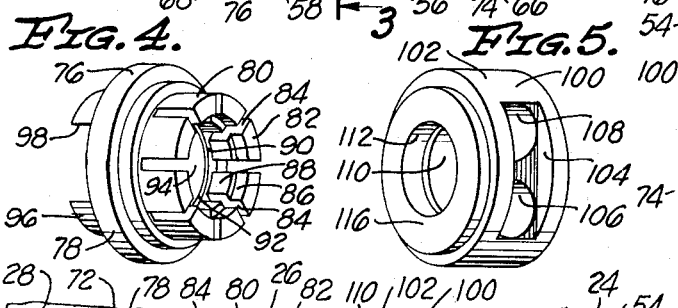
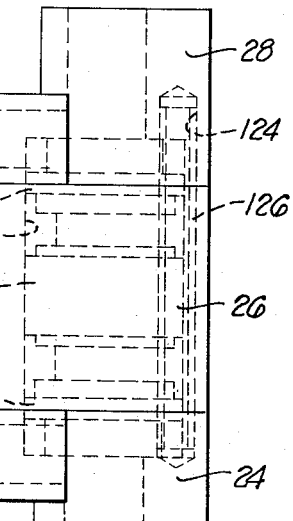
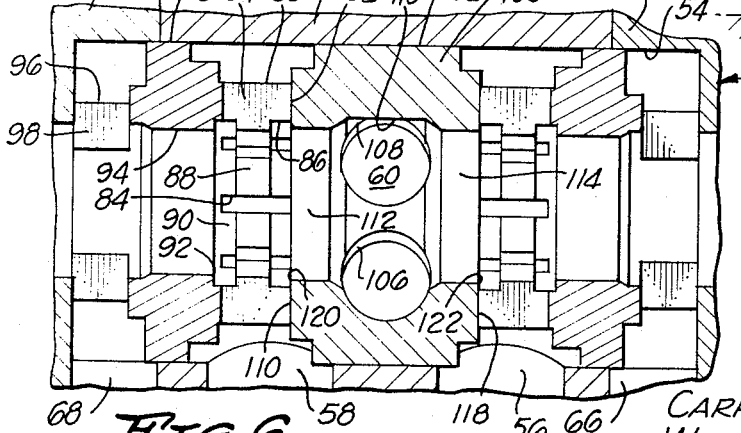
INVENTORS
CARROLL G. GORDON,
WILLIAM F. STOESSER
BY EDWARD D. O'BRIAN
ATTORNEY

United States Patent Office 3,354,912
Patented Nov. 28, 1967

3,354,912
SECTIONAL HYDRAULIC VALVE STRUCTURE
Carroll G. Gordon, 3 William Court, Menlo Park, Calif. 94025, and William F. Stoesser, 3366 Fayette Drive, Mountain View, Calif. 94040
Filed Jan. 11, 1965, Ser. No. 424,612
4 Claims. (Cl. 137—625.69)

ABSTRACT OF THE DISCLOSURE

Simplified manufacturing of a hydraulic valve, together with improved accuracy, is accomplished by providing a valve body which has a cylindrical bore therethrough. Within the bore are inserted a plurality of sleeves. These sleeves are of such design that they can be readily manufactured by conventional manufacturing procedures without the need for extensive undercutting at the end of a long boring bar. Since the bores are relatively short, short boring is all that is required. Radial slots are provided by milling operations. The sleeves are held in line by being seated in the body bore and are clamped in the axial direction by the body. When so assembled, the entire structure is secured together to provide a unitary structure having the requisite passages.

Background

This invention is directed to hydraulic valve structure and particularly to the manner in which the hydraulic valve body is assembled so as to provide a convenient, accurate and economic means for building the structure. The construction is particularly useful in the formation of proper porting for hydraulic valves.

Sliding spool valves are well known in the art, and these valves carry one or more lands on the spool which cooperate with ports within the body. Motion of the spool within the body moves the lands with respect to ports so that the ports are relatively opened or closed for the control of the flow of hydraulic fluid. This invention is directed to the manner in which the cooperating ports within the body are formed and specifically is directed to the forming of these ports in a convenient arrangement so that they are accessible and easily machined. Following machining is the assembly of the valve body by furnace brazing or the like so as to secure the ports in proper position to be cooperated with by the spool. This is very much superior to prior constructions which either form the port openings in a unitary body by machining through from the end of the body, which prevents fully proper port configuration for best valving effect, or contemplates machining a sleeve exteriorly of the body and then moving them into the valve body through an end opening into a sleeve bore. This latter construction does not fully secure the sleeve in place. Furthermore, the sleeve provides complex machining difficulties.

Accordingly, it is an object of this invention to provide a valve construction wherein during successive stages of valve construction valve ports are positioned in an accessible position for full and proper machining and thereafter the complete valve body is assembled so as to position the ports in proper valving relationship.

It is another object of this invention to provide a valve construction which at an intermediate stage of construction has separate sleeves which are arranged for economy of manufacture and ease of access to the ports therein, which sleeves are subsequently inserted in a sleeve bore in a valve body and the valve body is brazed or otherwise secured together so as to form a finished valve body having valving ports therein.

It is another object of this invention to provide a valve body construction when sleeves are inserted in the valve body in their bore therein and the sleeves serve to align the various valve body portions during their securement together by brazing or other means.

It is another object of this invention to provide alignment means to arrange several valve body sections in proper alignment.

It is another object of this invention to provide valve construction which provides for easy access for machining of port surfaces followed by subsequent assembly of the body to enclose the previously machined port sections and to define a complete valve body for coaction with a valve spool.

It is another object of this invention to provide an economic and convenient valve structure which is easy and accurate to manufacture and which provides a valve of long trouble free life.

It is another object of this invention to provide a valve structure wherein the porting surfaces can be easily, readily and economically manufactured to considerable accuracy so that the finished valve is of an economic construction and capable of excellent valving accuracy.

Other objects and advantages of this invention will become apparent from a study of the following portion of the specification, the claims and the attached drawings in which:

Description of the drawings

FIG. 1 is an isometric view of the preferred embodiment of the valve structure in accordance with my invention;

FIG. 2 is an enlarged longitudinal, vertical section therethrough;

FIG. 3 is a section taken along the line 3—3 of FIG. 2;

FIG. 4 is an enlarged isometric view of one of the sleeves employed in the valve of FIG. 1 shown rotated 90 degrees upon its axis for purposes of clarity;

FIG. 5 is an isometric view of another sleeve employed in the valve of FIG. 1;

FIG. 6 is an enlarged longitudinal section, with parts broken away, of the valve body of this invention showing the sleeves assembled in the main body portion;

FIG. 7 is a side elevational view of the valve of FIG. 1 showing the valve body in an intermediate stage of manufacture where it is stacked in a furnace for brazing together the several body parts.

Summary

As an aid to understanding this invention it can be stated in essentially summary form that it is directed to valve body structure where the valve is particularly adapted for the valving of hydraulic fluid flow. In the preferred embodiment, the valve body itself is made up of a plurality of body sections and these body sections have a common sleeve bore therein. Furthermore, suitable inner drilling and other hydraulic passage forming is provided in the body and is preferably arranged so that the passages can be machined from the intermediate separation points of the body. Sleeves are provided to perform the actual valving function in cooperation with a conventional spool. These sleeves have an external diameter suitable to properly fit within the sleeve bore and are of such individual construction as to be easily machined to accurate tolerances. These sleeves are positioned in the sleeve bore and the body portions are secured together so as to form an integral body with the sleeves permanently and accurately positioned therein. The sleeves preferably act as guides for proper alignment of the several body parts so that they are properly aligned during and after securement of the body parts together. Securement is preferably accomplished by furnace brazing, although other means can be conveniently used, depending upon the material of the valve body.

Description

This invention will be understood in greater detail by reference to the following portion of the specification wherein the drawings are described. Referring now to FIG. 1, valve 10 illustrated therein has its body 12 of a structure in accordance with this invention. Body 12 has appropriate mounting feet 14, 16, 18 and 20 which have their bottom surfaces aligned with planar bottom 22 of valve body 12. Valve body 12 is formed of sections 24, 26 and 28 which are secured together by brazing in the manner hereinafter described. As is seen in FIG. 2, valve body 12 contains spool 30 and carries end caps 32 and 34 so as to complete the valve.

Referring now in more detail to the structure of FIGS. 1 through 6, spool 30 comprises shaft 36 with lands 38 and 40 preferably integrally formed thereon. Shaft 36 passes through end caps 32 and 34 and is sealed with respect thereto by ring seals 42 and 44 respectively. End caps 32 and 34 are secured by screws 46 and 48 so as to be readily removable. Bore 50 is formed in section 24 and bore 52 is formed in section 28 to be of such diameter as to permit the insertion and removal of spool 30 with respect to valve body 12. Sleeve bore 54 is formed in valve body sections 24, 26 and 28 in such a manner as to be substantially parallel to and concentric with bores 50 and 52. Sleeve bore 54 extends all the way through section 26 and is formed as a recess in sections 24 and 28. Cylinder passages 56 and 58 are drilled from bottom 22 into bore 54 substantially in a plane with the axis of bore 54 and spool 30. Pressure passage 60, see FIG. 3, is drilled angularly upwardly from bottom 22 to intersect with bore 54 behind the axis thereof, as seen in FIG. 2. Drain or reservoir passage 62 is drilled upward from bottom 22 and intersects with inner drilled drain passage 64. Passage 64 is drilled through the entire length of section 26 and opens at the ends thereof. Drain slots 66 and 68 are formed in sections 24 and 28 to provide communication between inner drilled drain passage 64 and the ends of sleeve bore 54. Thus, bore 54 and the composite drain passage extend past the junctures 70 and 72 between sections 24 and 26, and 26 and 28 respectively.

Sleeves 74 and 76 are positioned within the bore 54. These sleeves are identical, and sleeve 76 is shown in isometric view in FIG. 4, and accordingly only sleeve 76 will be described in detail. Sleeve 76 has an outer diameter 78 which is of such size as to closely fit within bore 54. Reduced diameter boss 80 is formed on sleeve 76 and terminates in face 82. Reduced diameter 80 provides a cylindrical space in communication with cylinder port 58. Furthermore, diameter 80 has a plurality of slots 84 formed therein so as to permit this communication to go through to the interior of sleeve 76. Annular groove 86 is formed adjacent face 82 to be of a larger diameter than guide diameter 88. Annular groove 90 is similarly formed to a larger diameter than guide diameter 88 and is formed adjacent metering edge 92. Land 40 is guided upon guide diameter 88 and has its edge act in conjunction with metering edge 92 to control the flow of fluid from passage 58 to the interior 94 of sleeve 76. Sleeve 76 has a reduced exterior diameter at 96 and has slot 98 cut diametrically across the sleeve so as to open the interior of sleeve 76 to the end portion of bore 54 and drain slot 68. Thus, an opening is defined from cylinder passage 58 through the interior of sleeve 76 to drain passage 62, which opening is controlled by land 40 acting in conjunction with metering edge 92.

Sleeve 74 is identical to sleeve 76, but its position within valve body 12 is reversed so that it is bilaterally symmetrical with respect to the central section line in FIG. 2. Accordingly, sleeve 74 defines an opening from cylinder passage 56 to drain slot 66 and thence to drain passage 62, with opening is controlled by land 38 acting in conjunction with the metering edge in sleeve 74.

Sleeve 100, see FIGS. 2, 5 and 6, is positioned centrally of the bore 54 between sleeves 74 and 76. Sleeve 100 has an exterior diameter 102 of such size as to fit within the bore 54 with minimum clearance so as to properly position sleeve 100 without excessive leakage between the exterior diameter 102 and the interior of bore 54. Slot 104 is milled in a portion of surface 102 and sleeve 100 is positioned so that slot 104 is adjacent pressure passage 60, see FIG. 3. Holes 106 and 108 are drilled from slot 104 into annular recess 110 within sleeve 100. Interior surfaces 112 and 114 are formed in sleeve 100. These surfaces are cylindrical and are of the same diameter and coaxial with guide surfaces 88 and interior surface 94. Interior surfaces 112 and 114 terminate at faces 116 and 118 of sleeve 100 so as to define metering edges 120 and 122. The distance between these faces can be accurately formed by surface grinding or lapping so as to accurately determine the distance between the metering edges. These metering edges respectively act in co-operation with lands 40 and 38 to selectively meter hydraulic fluid under pressure from pressure passage 60, through the interior of sleeve 100 to cylinder passages 56 and 58. The overall axial length of bore 54 is substantially equal to the sum of the axial length of sleeves 74, 76 and 100. Thus, face 82 of sleeves 74 and 76 are respectively in engagement with faces 116 and 118 of sleeve 100. Thus, a total composite sleeve assembly is defined.

The sleeve assembly can be inserted within the bore 54 before the body 12 is furnace brazed into unitary form. When the sleeves are inserted into the bore 54, it is to be noted that the outer diameters 78 of sleeves 74 and 76 are positioned at the junctures 70 and 72 between the several body sections 24, 26 and 28. Thus, the sleeves act as an alignment structure for the body section. To further aid in the alignment of the body sections, bore 124, see FIGS. 3 and 7, is formed through body section 26 and into body sections 24 and 28. Tube 126 is inserted in this bore. Thus, since the body sections are aligned on two parallel axes, the body sections are maintained in proper alignment. The sleeves are inserted into the body sections and tube 126 is also inserted therein and the body sections are assembled and placed in a vertical position as is shown in FIG. 7. Appropriate treatment is provided for the juncture of the body section faces and appropriate material is supplied so that when the assembled body is subjected to appropriate furnace brazing procedures the body becomes a brazed unitary structure. The body is vertically positioned in the furnace, as is shown in FIG. 7, so that gravity aids in closing the junctures between the body section and gravity aids in keeping liquid brazing material in the interior of the valve from entering into the interior bores of the several sleeves.

After brazing, the unitary valve body 12 is given suitable surface finishing material, and if desired or necessary the interior surfaces of the sleeves are suitably finished by boring, reaming, grinding and/or honing so as to provide properly coaxial surfaces of proper roundness, finish and diameter for interrelationship with lands 38 and 40 on spool 30.

This invention having been described in its preferred embodiment, and further embodiments also illustrated, it is clear to be susceptible to numerous modifications and changes within the spirit of the invention and without the exercise of the inventive faculty. Accordingly, the scope of this invention is defined by the scope of the following claims.

We claim:

1. A hydraulic valve structure, said hydraulic valve structure comprising a valve body and a valve spool;
   said valve body being formed of first, second and third body sections, said body sections having an axis therethrough, a cylindrical bore formed in said first, second and third body sections, said cylindrical bore terminating in the first and second faces in said first and third body sections and said cylindrical bore extending all the way through said second body section, said cylindrical bore defining adjacent cylindrical surfaces in said first and second and said second and third body sections, first, second and third sleeves positioned within said bore, said first, second and third sleeves each having a cylindrical outer surface formed about said axis and engaging with the interior surfaces of said bore, said first sleeve having its outer surface engaging in said bore at said adjacent cylindrical surfaces in said first and second body sections and said third sleeve having its outer surface engaging within said bore at said adjacent cylindrical surfaces in said second and third body sections so that said body sections are maintained by contact with adjacent surfaces with the axes of said bores coaxial, said first sleeve being in axial engagement with said first face in said first body member and in axial engagement with said second sleeve, said second sleeve also being in axial engagement with said third sleeve, said third sleeve also being in axial engagement with said second face in said third body section so that said first, second and third sleeves are axially restrained, means securing said body sections together, a valve bore through said first, second and third sleeves and positioned with the axes of said valve bore coaxial with said axis;

said valve spool being positioned within said valve bore, said valve spool having lands thereon so as to regulate flow of fluid through said valve bore.

2. The valve structure of claim 1 wherein said first sleeve has a boss of reduced diameter axially away from said cylindrical surface in each direction, each of said sleeve sections of reduced diameter having openings therethrough so as to permit the flow of fluid from the interior to the exterior of said first sleeve.

3. The valve structure of claim 2 wherein said third sleeve is substantially identical to said first sleeve.

4. The valve structure of claim 1 wherein the juncture between said first and second body sections forms a first interface and said juncture between said second body section and said third body section forms a second interface, a slot formed adjacent at least one of said interfaces so as to form a fluid passage connecting with said bore in said body section.

References Cited

UNITED STATES PATENTS

| | | | |
|---|---|---|---|
| 2,747,611 | 5/1956 | Hewitt | 137—625.69 |
| 2,920,650 | 1/1960 | Moog | 137—625.69 |
| 2,985,190 | 5/1961 | Kettering | 137—625.69 |
| 2,973,746 | 3/1961 | Jupa | 137—625.63 |
| 2,982,306 | 5/1961 | Fitzgibbon | 137—625.64 |
| 3,199,535 | 8/1965 | Baer | 137—625.67 X |

FOREIGN PATENTS

| | | |
|---|---|---|
| 569,829 | 6/1945 | Great Britain. |
| 829,785 | 3/1960 | Great Britain. |

M. CARY NELSON, *Primary Examiner.*

H. T. KLINKSIEK, *Examiner.*